US008683524B2

(12) United States Patent
Green et al.

(10) Patent No.: US 8,683,524 B2
(45) Date of Patent: Mar. 25, 2014

(54) METHODS AND APPARATUS TO DISTINGUISH ELEMENTS OF A USER INTERFACE

(75) Inventors: David P. Green, Castaic, CA (US); Eric J. Bennett, Los Angeles, CA (US); Tyson L. Wintibaugh, Marina del Rey, CA (US); Tommi Iten, Redondo Beach, CA (US); Chris Roy, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 487 days.

(21) Appl. No.: 11/931,760

(22) Filed: Oct. 31, 2007

(65) Prior Publication Data

US 2009/0113474 A1    Apr. 30, 2009

(51) Int. Cl.
G06F 3/00 (2006.01)
G06F 13/00 (2006.01)
H04N 5/445 (2011.01)

(52) U.S. Cl.
USPC ............................................. 725/50; 725/44

(58) Field of Classification Search
None
See application file for complete search history.

(56) References Cited

U.S. PATENT DOCUMENTS

| 5,532,754 | A | * | 7/1996 | Young et al. | 725/47 |
| 6,442,755 | B1 | * | 8/2002 | Lemmons et al. | 725/47 |
| 2003/0007005 | A1 | * | 1/2003 | Kandogan | 345/763 |
| 2003/0020744 | A1 | * | 1/2003 | Ellis et al. | 345/723 |
| 2003/0149982 | A1 | * | 8/2003 | Nakashima et al. | 725/47 |
| 2004/0123318 | A1 | * | 6/2004 | Lee et al. | 725/46 |
| 2006/0020973 | A1 | * | 1/2006 | Hannum et al. | 725/46 |
| 2006/0156345 | A1 | * | 7/2006 | Ozawa | 725/58 |
| 2007/0101375 | A1 | * | 5/2007 | Haberman | 725/86 |
| 2008/0127269 | A1 | * | 5/2008 | Chicles | 725/44 |
| 2008/0199144 | A1 | * | 8/2008 | Hailey et al. | 386/46 |
| 2008/0271080 | A1 | * | 10/2008 | Gossweiler et al. | 725/47 |
| 2008/0313671 | A1 | * | 12/2008 | Batrouny et al. | 725/40 |

* cited by examiner

*Primary Examiner* — Jason J Chung

(57) ABSTRACT

Methods and apparatus to distinguish elements of a user interface are described. An example user interface includes a plurality of channel cells including a first channel cell having a first attribute and a second channel cell having a second attribute; and a plurality of program cells associated with the plurality of channel cells, wherein at least one program cell has a third attribute, wherein the third attribute distinguishes the at least one program cell from an associated channel cell.

18 Claims, 6 Drawing Sheets

METHODS AND APPARATUS TO DISTINGUISH ELEMENTS OF A USER INTERFACE

FIELD OF THE DISCLOSURE

The present disclosure relates generally to user interfaces and, more particularly, to methods and apparatus to distinguish elements of a user interface.

BACKGROUND

Media presentation systems may include a user interface, having a program guide or tool to assist a user in parsing or searching through content (e.g., television programming or on-demand programs). Typically, such a program guide is implemented via an on-screen list or menu. The program guide may indicate what programs, movies, music, or other events are scheduled for broadcast at certain times or which programs are available for download. A user may manipulate such a program guide to determine upcoming or current programming by moving a cursor through the guide via a remote control or similar input device. Generally, the program guide enables a user to navigate through available and/or upcoming content and to select content for viewing, listening, and/or downloading.

DETAILED DESCRIPTION

Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

The example methods and apparatus described herein to distinguish elements of a user interface of a media presentation system (e.g., a home entertainment system including a media signal decoder and a television) may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following description is made with respect to example DIRECTV® services and systems, it should be understood that many other delivery systems are readily applicable to the disclosed methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and fiber optic networks.

Figure 1:
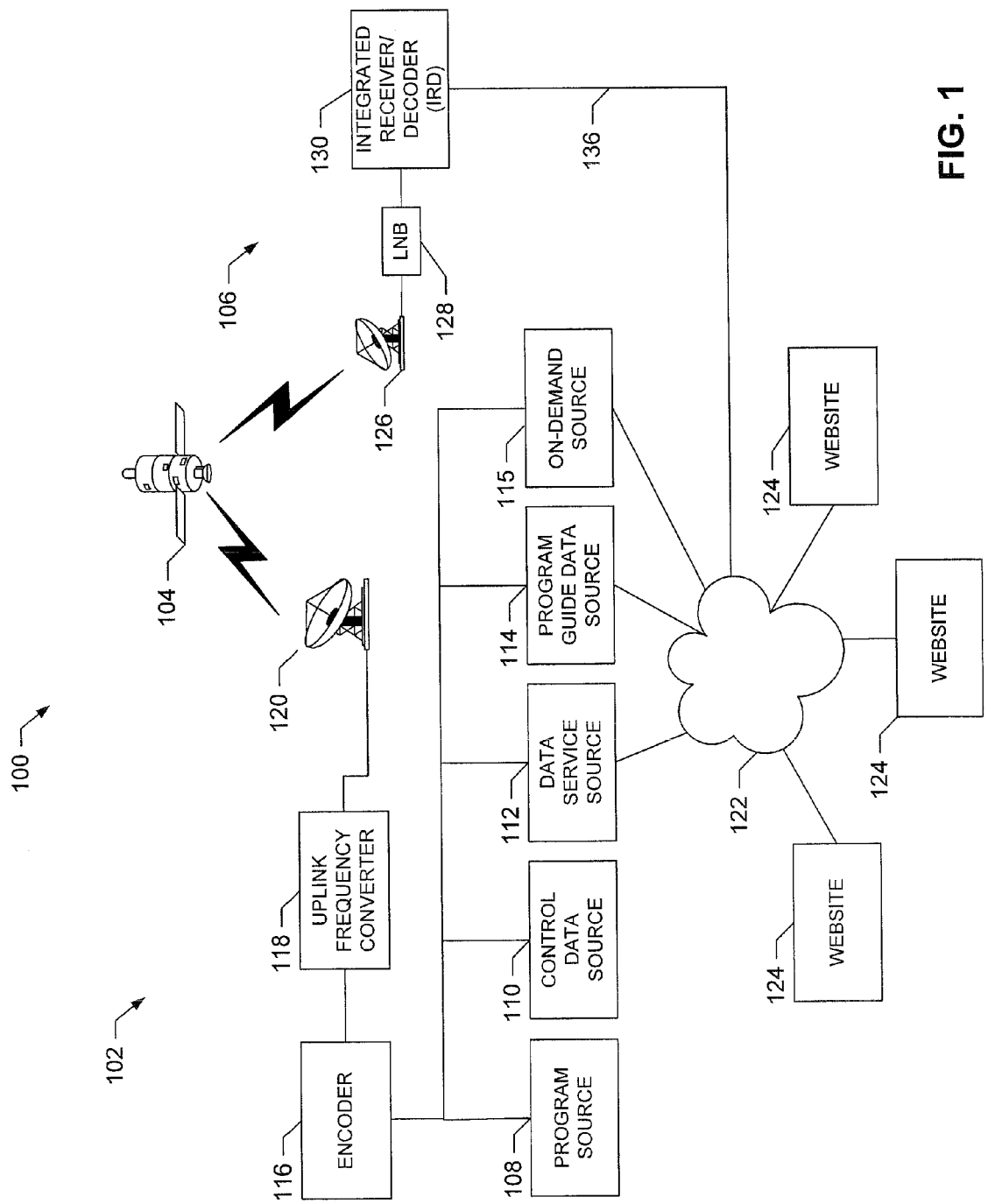
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136.

In further detail, the example transmission station 102 of the example system of FIG. 1 includes a plurality of sources of data and/or information (e.g., program sources 108, a control data source 110, a data service source 112, one or more program guide data sources 114, and an on-demand source 115). During operation, information from one or more of these sources 108-115 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via a network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., an remote control). For example, a cursor may be moved to highlight a program description within the guide. A user may then select a highlighted program description via the input device to navigate to associated content (e.g., an information screen containing a summary of a television show episode) or active an interactive feature (e.g., a program information screen, a recording process, a future showing list, etc.) associated with an entry of the program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Figure 2:
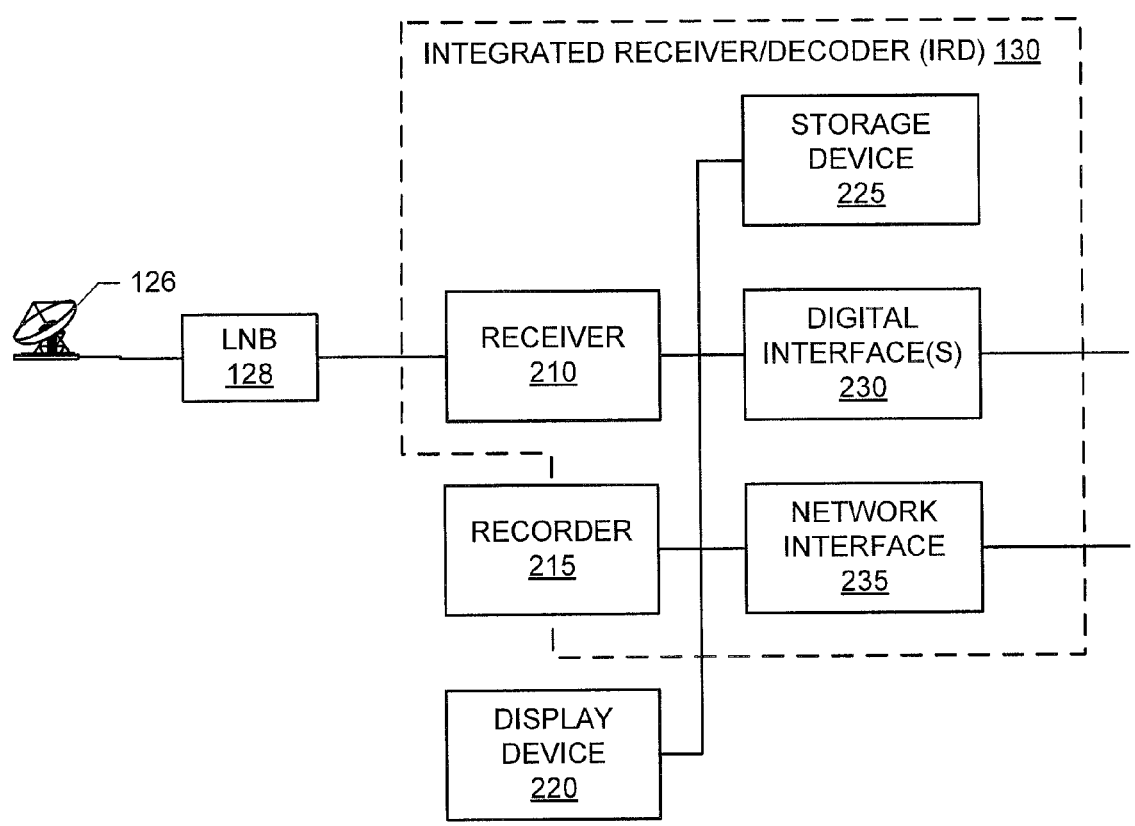
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

Having described an example content delivery system, example methods and apparatus to distinguish elements of a user interface are now described. As described above, a program guide and/or user interface may facilitate an interaction between a user and a content delivery system. In general, a user may utilize the program guide as an information source and/or as a tool to improve the manipulation of the user interface. In the examples described below in connection with FIGS. 3-5, different attributes may be assigned to different sections or portions of the program guide to distinguish and/or draw the attention of a user to one or more elements (e.g., a channel cell) of a program guide.

In contrast to prior art approaches, the methods and apparatus described herein provide clear distinctions in a program guide without creating visual confusion and/or a chaotic presentation. Further, the example methods and apparatus described herein implement the example distinctions while not disrupting the overall aesthetics of the program guide. For example, a channel cell may be assigned one or more attributes (e.g., a shape, a color, a size, an image, etc.) that visually distinguishes the channel cell from the remainder of the program guide, including other channel cells and corresponding program cells. Such distinctions enable a user to easily discern a channel cell (e.g., by classification or type, as described below) without creating a chaotic visual experience and without drastically altering the overall appearance of the program guide.

Significant time, effort, and/or financial resources may be committed to creating a pleasing, efficient program guide that is in harmony with the entire user interface (e.g., a thematic user interface). Thus, any disturbance or alteration of the program guide may adversely influence the effectiveness of the user interface as a whole and/or the program guide itself. However, the example methods and apparatus described herein enable a content provider (e.g., DIRECTV) to design a program guide having the ability to demarcate selected elements while maintaining harmony with the fundamental aspects (i.e., common themes) of the user interface. The examples described herein also enable a content provider (e.g., DIRECTV) to present a user with more information than previously available regarding channels and content available thereon.

Figure 3:
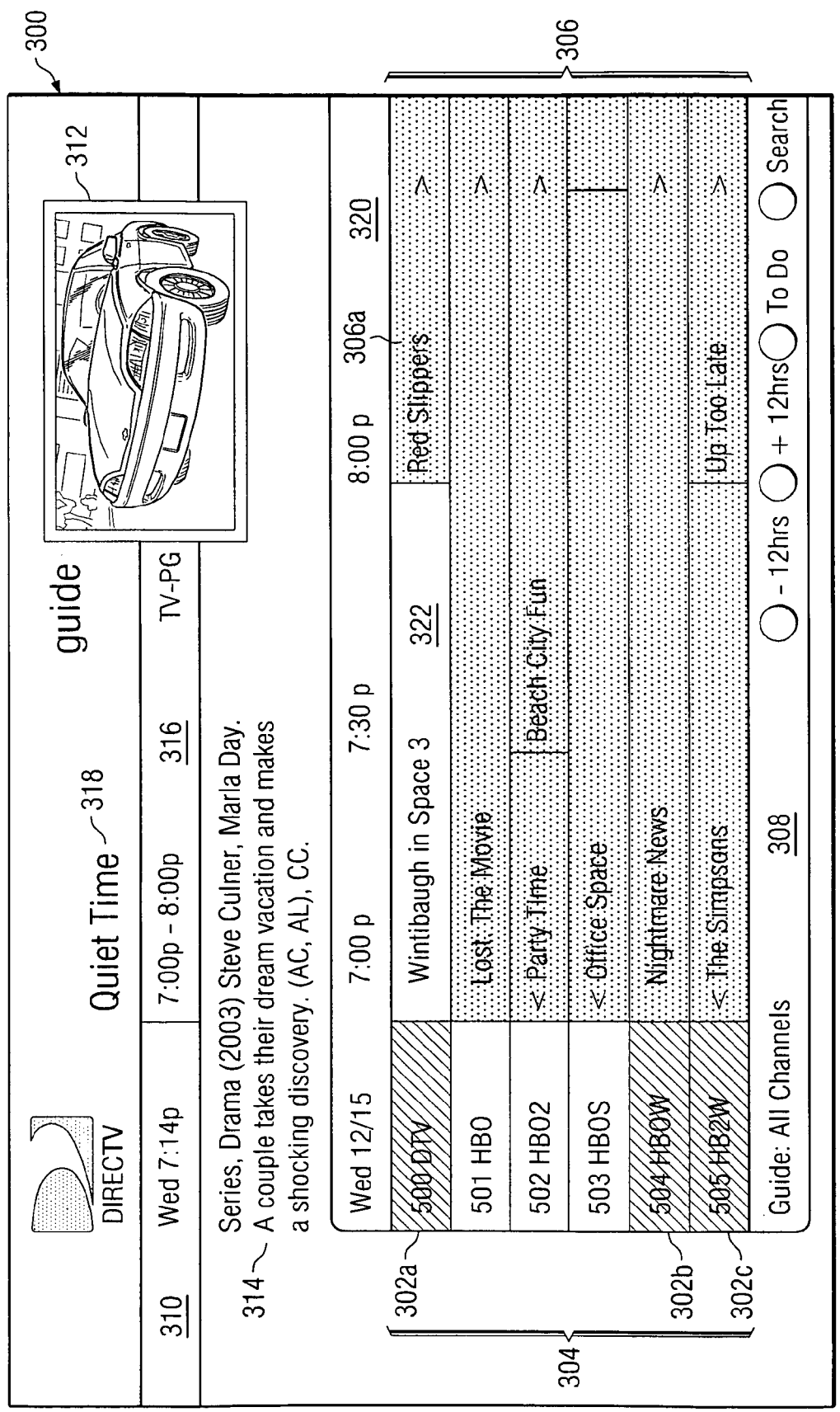
FIG. 3 shows an example program guide including a first example distinct program guide element.

FIG. 3 shows an example program guide 300 including example distinct elements 302a, 302b, and 302c. In this example, the program guide 300 includes a list of channel cells 304, a list of program cells 306, a button bar 308, a current date and time section 310, a video section 312, an information section 314, a program schedule bar 316, a title section 318, and a time indicator 320. However, the program guide 300 (as well as the program guides 400 and 500 of FIGS. 4 and 5) is only one example that may vary in arrangement, shape, number of sections, type of information, etc. Such a program guide 300 may be designed and/or implemented, for example, by the administrators of the content delivery system (e.g., DIRECTV programmers).

Elements of the list of channel cells 304 are associated with elements of the list of program cells 306 and together the lists 304 and 306 enable a user to determine which programs can be seen on which channels for given times. In the illustrated example of FIG. 3, the list of program cells 306 is positioned adjacent to the list of channel cells 304, such that individual program cells (e.g., program cell 306a) are aligned with the associated individual channel cells (e.g., channel cell 302a). The time indicator 320 informs the user of a day and time to which the currently displayed program cells correspond and may be set, for example, in 30 minutes increments or any other suitable duration. A user may shift the displayed time period (and thus the corresponding entries of the list of program cells 306) via an input device using a set of keys that move a cursor within the program guide. Additionally or alternatively, the button bar 308 may be used to shift the time period of the time indicator 320. The button bar 308 may include graphics and/or text to indicate an operation corresponding to a button on an input device (e.g., an IR remote control). For example, the dots shown on the button bar 308 may be different colors to correspond to a same color button on an input device. By way of illustration, the operations shown on the button bar 308 of FIG. 3 are '−12 hrs,' '+12 hrs,' 'To Do,' and 'Search.' The corresponding buttons on the input device support a one-touch functionality that allows the same button to be used for multiple one-touch functions on different screens of the user interface. Here, the first button (i.e., the '−12 hrs' button) may be red and may correspond to an operation that shifts the time indicator 320 and, thus, the list of program cells 306 to 12 hours earlier than the currently displayed time period. Conversely, the second button (i.e., the +12 hrs button) may correspond to an operation that shifts the time indicator 320 and the list of program cells 306 to 12 hours later than the currently displayed time period. Further, the current date and time section 310 may be referenced when navigating through the program guide 300.

The video section 312 may include a display of the channel to which the system is currently tuned, or the recorded content currently being played back. The video section 312 allows a user to continue viewing broadcast or recorded content while navigating through the program guide 300. For example, if a user is viewing a live baseball game and navigates (e.g., by engaging a button on an input device) to the program guide 300, the video section 312 displays the baseball game. In another example, if a recording of a movie is currently being played and a user navigates to the program guide 300, the video section 312 displays the recorded movie, allowing the user to simultaneously examine the program guide 300 and watch the recorded content. The video section 312 may also present alternative content (e.g., an advertisement or promotion) as determined by, for example, the administrators of the content delivery system (e.g., DIRECTV® programmers) or the user.

The information section 314, program schedule bar 316, and title section 318 display information associated with, for example, a currently highlighted list entry 322. As mentioned above, the user may highlight such an entry via navigation buttons on an input device. The information section 314 may include a description of a television show, a list of lead actors, purchase information, duration information, a plot summary, etc. The program schedule bar 316 may indicate the date, time, and duration of the currently highlighted list entry 322. The title section 318 may include the title of a program, a channel, mode of operation, etc.

As mentioned above, the example methods and apparatus described herein enable a content provider to distinguish and/or draw attention to one or more elements (e.g., a channel or program cell) of a program guide. In some examples, various attributes may be assigned to different elements of the program guide. In the illustrated example of FIG. 3, selected channel cells 302a, 302b, and 302c may be assigned a color/shade (e.g., red, purple, green, etc.) based on, for example, a classification (e.g., movies, sports, adult, etc.), a type of channel (e.g., on-demand, cable, network, pay-per-view, etc.), a subscription status, broadcast resolution (e.g., standard definition, high definition, etc.), and/or the availability of new content (e.g., a newly available on-demand program that is detectable by, for example, setting a flag, reading a value in a header, or updating a status signal) on the associated channel. In some examples, movie channels (e.g., channels cells 302b and 302c) may be assigned red as a color/shade attribute, pay-per-view channels (e.g., channel cell 302a) may be assigned green as a color/shade attribute, sports channels may be assigned purple as a color/shade attribute, etc. Additionally and/or alternatively, a color/shade attribute may be assigned to a channel cell based on the content being played on the associated channel at the time being displayed in the program guide. For example, a channel cell that represents a general channel (e.g., a channel without an assigned classification) may be temporarily assigned a red color/shade attribute for times at which a movie is being played on the channel. Moreover, the list of channel cells 304 may be assigned a default color/shade (e.g., navy blue) to be displayed in the absence of any attribute assignments to the contrary. Thus, one or more categories of channels may be demarcated among the list of channel cells 304 and, therefore, may be visually distinct.

Further, the list of program cells 306 may be assigned a color/shade substantially similar (e.g., sky blue) to the default color/shade (e.g., navy blue) of the list of channel cells 304. Alternatively, the list of program cells 306 may be assigned a color/shade (e.g., orange) substantially different from the default color (e.g., navy blue) of the list of channel cells 304 and any color/shade that may be assigned to a distinct channel cell (e.g., the selected channel cells 302a, 302b, and 302c). In other words, the list of program cells 306 and the attributes assigned thereto may be visually distinct from the list of channel cells 304, including the channel cells 302a, 302b, 302c that have been assigned a distinguishing attribute. Further, a selected program cell (e.g., the highlighted program cell 322) may temporarily have a distinct color/shade (e.g., yellow) when selected or highlighted.

While FIG. 3 illustrates an example program guide 300 and example color/shade arrangements have been described above, other example program guides and color/shade arrangements are possible. Further, text occupying the channel cells and program cells may also be assigned distinguishing color/shade attributes to distinguish an element based on a classification, new content, subscription status, etc. The color/shade of such text may temporarily change when a channel cell or program cell is selected or navigated to by a user.

Figure 4:
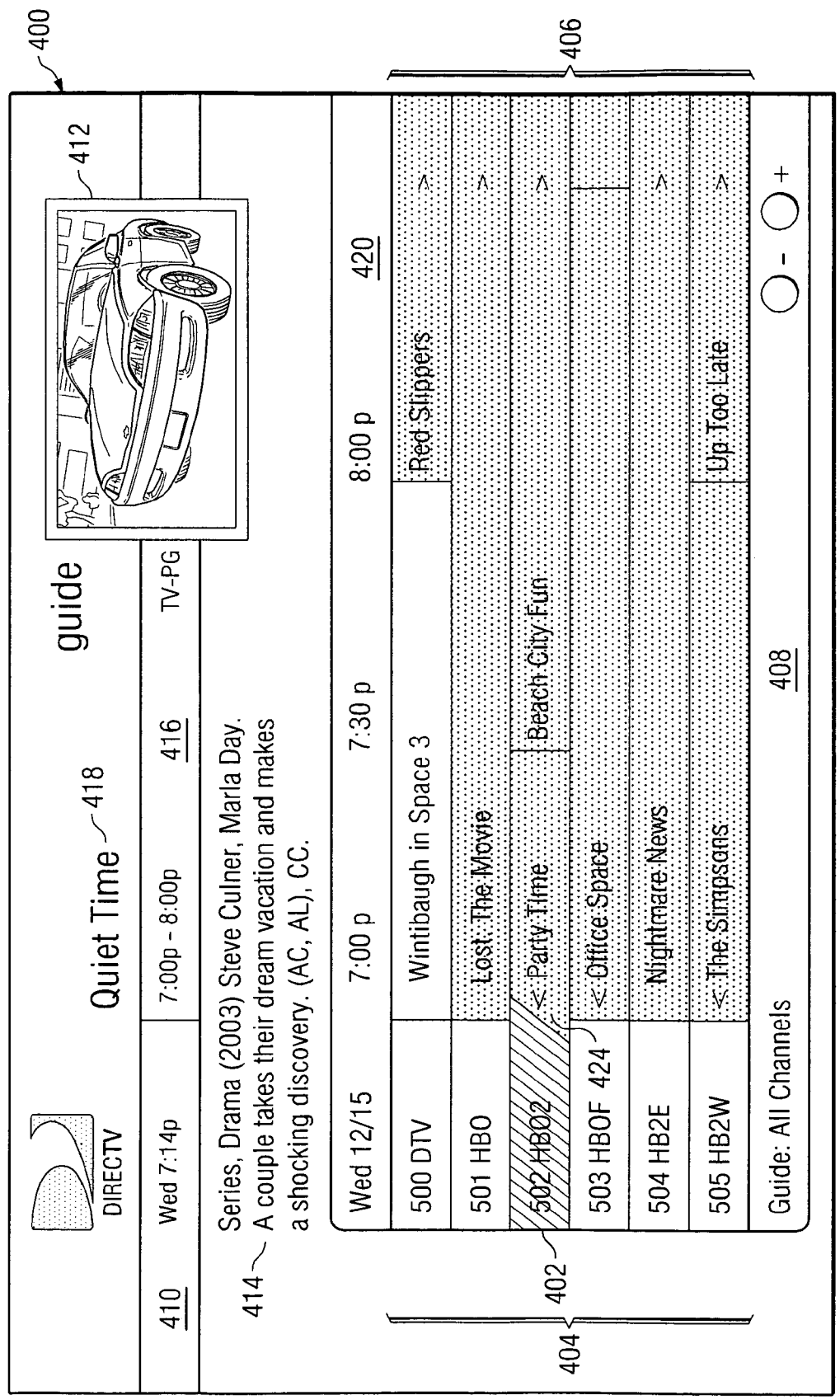
FIG. 4 shows an example program guide including a second example distinct program guide element.

FIG. 4 shows another example program guide 400 including an example distinct element 402. Similar to the program guide 300 of FIG. 3, the program guide 400 of FIG. 4 includes a button bar 408, a current date and time section 410, a video section 412, an information section 414, a program schedule bar 416, a title section 418, and a time indicator 420, all of which perform similar functions as the related elements of FIG. 3. Further, the program guide 400 includes a list of channel cells 404 and a list of program cells 406. The list of channel cells 404 may include an example distinct element 402, which may be assigned a shape attribute to distinguish and/or draw attention to the channel (and the associated programming) represented by the distinct element 402. For example, the distinct element 402 may include a pointed or angled side adjacent the list of program cells 406. As illustrated in FIG. 4, the upper-right corner of the distinct element (i.e., channel cell) 402 is projected towards the list of program cells 406, while the lower-right corner of the distinct element 402 recedes into the list of channel cells 404. Such an assigned attribute may differ from the remaining channel cells, which may be assigned a default shape (e.g., a rectangle).

Further, channel cells may be assigned alternative shape attributes. For example, the distinct element 402 may be assigned the illustrated shape attribute based on the classification of the associated channel as a movie channel. Other channel cells (e.g., those associated with sports programming) may be assigned, for example, an opposite shape attribute. In other words, other channel cells may be assigned a shape attribute in which the lower-right corner of the side adjacent a list of program cells projects towards the list of program cells, while the upper-right corner of the side adjacent the list of program cells recedes into the list of channel cells. In other example (e.g., channel cells associated with pay-per-view content), a side adjacent the program cells may taper towards the list of program cells, thereby coming to a centered point towards the list of program cells). In other examples (e.g., channel cells associated with unsubscribed to channels), a side adjacent the list of program cells may be jagged, serrated, or toothed.

Further, a program cell may be assigned a shape attribute to correspond with the shape attribute assigned to the associated channel cell. In other words, a program cell may be assigned a shape attribute that is the counterpart of the shape attribute assigned to the associated channel cell. In the illustrated example of FIG. 4, program cell 424 is shaped to abut the angled portion of the distinct channel cell 402. Specifically, the lower-left corner of the program cell 424 projects towards the list of channel cells 404, and the upper-left corner of the program cell 424 receded into the list of program cells 406. Such an assigned shape attribute may differ from a default shape (e.g., a rectangle) assigned to the elements of the list of program cells 406. In other examples, where a channel cell has a serrated or toothed side adjacent the associated program cell, the program cell may be assigned a complimentary serrated or toothed shape attribute to fit together (i.e., interlaced) with the channel cell. Thus, assigning a shape attribute to an element of the program guide (e.g., a channel cell and/or an associated program cell) may distinguish one or more elements to a user. Distinguishing shape attributes may be based on, for example, a classification (e.g., movies, sports, adult, etc.), a type of channel (e.g., on-demand, cable, network, pay-per-view, etc.), subscription status, broadcast resolution (e.g., standard definition, high definition, etc.), and/or the availability of new content (e.g., a newly available on-demand program) on the associated channel.

Figure 5:
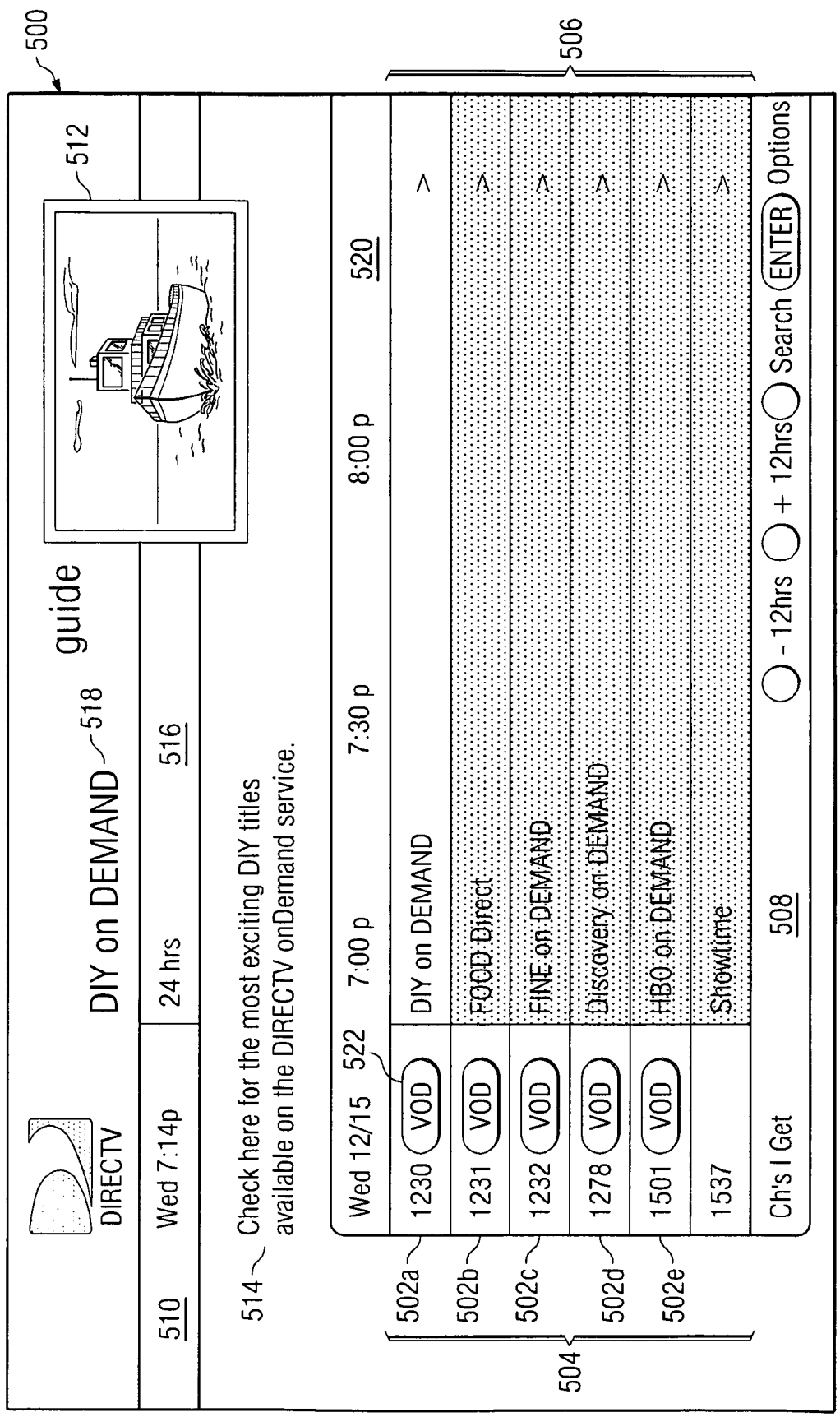
FIG. 5 shows an example program guide including a third example distinct program guide element.

FIG. 5 shows another example program guide 500 including example distinct elements 502a-e. Similar to the program guide 300 of FIG. 3, the program guide 500 of FIG. 5 includes a button bar 508, a current date and time section 510, a video section 512, an information section 514, a program schedule bar 516, a title section 518, and a time indicator 520, all of which perform similar functions as the related elements of FIG. 3. Further, the program guide 500 includes a list of channel cells 504 and a list of program cells 506. The list of channel cells 504 may include example distinct elements 502a-e, which may be assigned an image (e.g., a logo, icon, text, etc.) attribute to distinguish and/or draw attention to the channels (and the associated programming) represented by the distinct elements 502a-e. For example, the distinct elements 502a-e may include a 'VOD' icon 522 to indicate that the associated channel is dedicated to video on-demand content and/or services. In other examples, elements of the list of channel cells 504 may be assigned an image attribute based on a classification (e.g., movies, sports, adult, etc.), a type of channel (e.g., on-demand, cable, network, pay-per-view, etc.), subscription status, broadcast resolution (e.g., standard definition, high definition, etc.), and/or the availability of new content (e.g., a newly available on-demand program) on the channel. Image attributes may include a logo or trademark corresponding to a sponsor of the channel, a content provider, a service provider, or an image to represent a classification (e.g., a 'MOVIE' image or 'NEWS' image). Thus, each classification or category of channels may be assigned a different image attribute, thereby enabling a user to easily discern the type of channel associated with each channel cell and/or the availability of new content on a channel.

While several example methods and apparatus to distinguish elements of a program guide are described above, any of the examples and/or equivalents thereof may be combined to enable an additional and/or alternative distinction among elements (e.g., channel cells). For example, the distinct element 402 of FIG. 4 may also be assigned a distinguishing color/shade, as are the distinct elements 302a, 302b, and 302c of FIG. 3. In other examples, an image attribute (as described in connection with FIG. 5) may be assigned to the distinct element 402 of FIG. 4, which may also include a distinct color/shade (as described in connection with FIG. 3).

The methods and apparatus described herein may be designed by, for example, a content delivery system (DIRECTV®) programmer or a content provider (e.g., a broadcasting company). Where the element attributes (e.g., a company logo or color) are designed and/or added to elements of a program guide by a content provider (e.g., the National Broadcasting Company), the content delivery system programmer may make adjustments to tailor the attributes to comply with system parameters (e.g., size or shape of a graphic). The attributes may be assigned to different program guide elements for variable, static, or dynamic durations. Additionally, the assignment and duration of the attribute assignments 302 may be implemented via a variety of methods. In some examples, the program guide and the information associated with certain elements (e.g., a list of channel cells) may be accompanied by a plurality of flags or indicators (e.g., sections of data in the header of a packet) in transmission (e.g., over the system 100 described in connection with FIG. 1) to a presentation system (e.g., a set-top-box). The flags may instruct the presentation system regarding the assignment and/or duration of the attributes.

Figure 6:
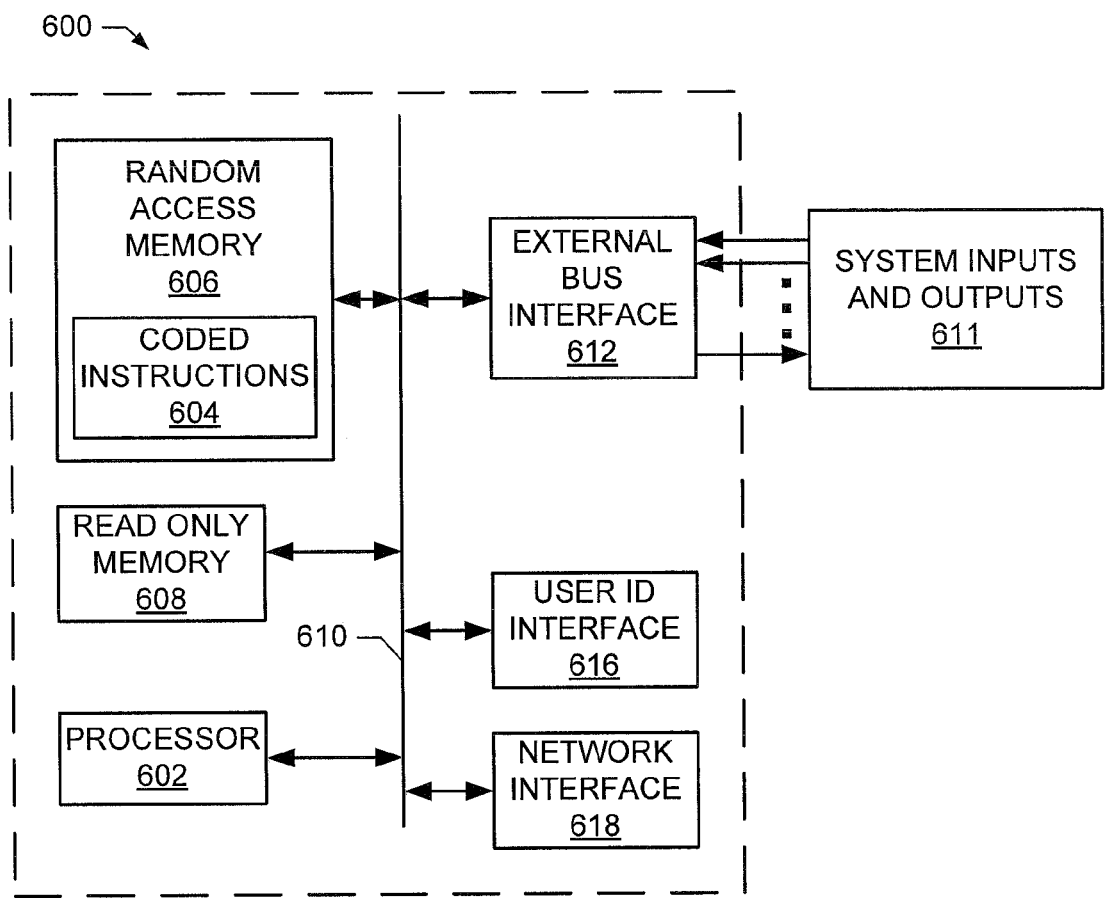
FIG. 6 illustrates an example manner of implementing an example processor unit to execute the example methods and apparatus described herein.

FIG. 6 is a schematic diagram of an example manner of implementing an example processor unit 600 to execute the example methods and apparatus described herein. The example processor unit 600 of FIG. 6 includes a general purpose programmable processor 602. The example processor 602 may execute, among other things, machine accessible instructions 604 (e.g., instructions present within a random access memory (RAM) 606 as illustrated and/or within a read only memory (ROM) 608) to perform the example processes described herein. The example processor 602 may be any type of processing unit, such as a microprocessor from the Intel® Pentium® family of microprocessors, the Intel® Itanium® family of microprocessors, and/or the Intel XScale® family of processors. The processor 602 may include on-board analog-to-digital (A/D) and digital-to-analog (D/A) converters.

The processor 602 may be coupled to an interface, such as a bus 610 to which other components may be interfaced. The example RAM 606 may be implemented by dynamic random access memory (DRAM), Synchronous DRAM (SDRAM), and/or any other type of RAM device, and the example ROM 608 may be implemented by flash memory and/or any other desired type of memory device. Access to the example memories 608 and 606 may be controlled by a memory controller (not shown) in a conventional manner.

To send and/or receive system inputs and/or outputs, the example processor unit 600 includes any variety of conventional interface circuitry such as, for example, an external bus interface 612. For example, the external bus interface 612 may provide one input signal path (e.g., a semiconductor package pin) for each system input. Additionally or alternatively, the external bus interface 612 may implement any variety of time multiplexed interface to receive output signals via fewer input signals.

To allow the example processor unit 600 to interact with a remote server, the example processor unit 600 may include any variety of network interfaces 618 such as, for example, an Ethernet card, a wireless network card, a modem, or any other network interface suitable to connect the processor unit 600 to a network. The network to which the processor unit 600 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 600 has been illustrated in FIG. 6, processor units may be implemented using any of a variety of other and/or additional devices, components, circuits, modules, etc. Further, the devices, components, circuits, modules, elements, etc. illustrated in FIG. 6 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. An apparatus, comprising:
a processor to implement a user interface including a program guide, the program guide comprising:
a plurality of channel cells each identifying a channel on which programming content can be accessed, the plurality of channel cells including a first channel cell associated with a first channel and having a first attribute and a second channel cell associated with a second channel and having a second attribute different from the first attribute, wherein the color is assigned to the second attribute based on a classification of the second channel, a type of the second channel, a subscription status associated with the second channel, a broadcast resolution associated with the second channel, and an availability of new audiovisual content on the second channel; and
a plurality of program cells each identifying the programming content available on a respective one of the channels identified by a respective one of the plurality of channel cells, wherein the color is to be assigned to the second attribute based on the availability of new audiovisual content at a first time in response to an audiovisual program that was unavailable for audiovisual presentation via the second channel represented by the second channel cell prior to the first time becoming available for audiovisual presentation via the first second channel at the first time, wherein the second channel is available on the program guide prior to the first time.

2. An apparatus as defined in claim 1, wherein the first attribute is visually distinct from the second attribute.

3. An apparatus as defined in claim 1, the user interface further comprising a default color for the first and second attributes, wherein the color assigned to the second attribute is visually distinct from the default attribute.

4. An apparatus as defined in claim 1, wherein at least a first one of the program cells is assigned a third attribute distinguishing the first one of the program cells from a corresponding one of the channel cells.

5. An apparatus as defined in claim 4, wherein the third attribute comprises a default attribute visually distinct from the first and second attributes.

6. An apparatus as defined in claim 4, wherein the third attribute is a shape attribute.

7. An apparatus as defined in claim 4, wherein the third attribute is a shape attribute complimentary to shape attributes of the first and second channel cells.

8. An apparatus as defined in claim 1, wherein the third attribute is an image attribute.

9. An apparatus as defined in claim 1, wherein the audiovisual program that was unavailable for audiovisual presentation via the second channel prior to the first time is a piece of media content accessible for viewing on the second channel.

10. An apparatus as defined in claim 1, wherein the audiovisual content that was unavailable for audiovisual presentation via the second channel prior to the first time is an on-demand program.

11. A method for use in a program guide, comprising:
displaying a plurality of channel cells each identifying a channel on which programming content is accessible;
displaying a plurality of program cells each identifying the programming content available on a respective one of the channels identified by a respective one of the plurality of channel cells;
assigning, using a programmable processor, a first attribute to a first channel cell associated with a first channel and a second attribute to a second channel cell associated with a second channel different from the first attribute and assigning a color to the second attribute based on a classification of the second channel, a type of the second channel, a subscription status associated with the second channel, a broadcast resolution associated with the second channel, and an availability of new audiovisual content on the second channel, wherein assigning the color to the second attribute based on the availability of new audiovisual content comprises assigning the color at a first time in response to an audiovisual program that was unavailable for audiovisual presentation via the second channel represented by the second channel cell prior to the first time becoming available for audiovisual presentation via the second channel at the first time, wherein the second channel is available on the program guide prior to the first time.

12. A method as defined in claim 11, further comprising assigning a default attribute to at least one of the channel cells, wherein the first and second attributes are visually distinct from the default attribute.

13. A method as defined in claim 11, further comprising assigning a third attribute to at least a first one of the program cells, wherein the third attribute distinguishes the first one of the program cells from a corresponding one of the channel cells.

14. A media presentation system comprising:
a transmission system capable of generating and transmitting streams of audiovisual data to a receiver capable of receiving audiovisual data and generating video and audio output signals; and
a program guide comprising:
a plurality of channel cells each identifying a channel on which programming content is accessible, the plurality of channel cells including a first channel cell associated with a first channel and having a first attribute and a second channel cell associated with a second channel and having a second attribute different from the first attribute, wherein the color is assigned to the second attribute based on a classification of the second channel, a type of the second channel, a subscription status associated with the second channel, a broadcast resolution associated with the second channel, and an availability of new audiovisual content on the second channel; and
a plurality of program cells each identifying the programming content available on a respective one of the channels identified by a respective one of the plurality of channel cells, wherein the color is to be assigned to the second attribute based on the availability of new audiovisual content at a first time in response to an audiovisual program that was unavailable for audiovisual presentation via a first channel represented by the second channel cell prior to the first time becoming available for audiovisual presentation via the first channel at the first time, wherein the first channel is available on the program guide prior to the first time.

15. A media presentation system as defined in claim 14, further comprising a default attribute assigned to the plurality of channel cells, wherein the first and second attributes are visually distinct from the default attribute.

16. A media presentation system as defined in claim 14, wherein at least a first one of the program cells is assigned a third attribute distinguishing the first one of the program cells from a corresponding one of the channel cells.

17. A media presentation system as defined in claim 16, further comprising an on-demand service, wherein the third attribute comprises an image attribute indicating that the first channel associated with the first attribute includes on-demand content.

18. A media presentation system as defined in claim 14, wherein the first and second channel cells include a combination of color attributes, shape attributes, and image attributes.

* * * * *